A. Ferber,
Shutter Worker.
N° 26,979. Patented Jan. 31, 1860.
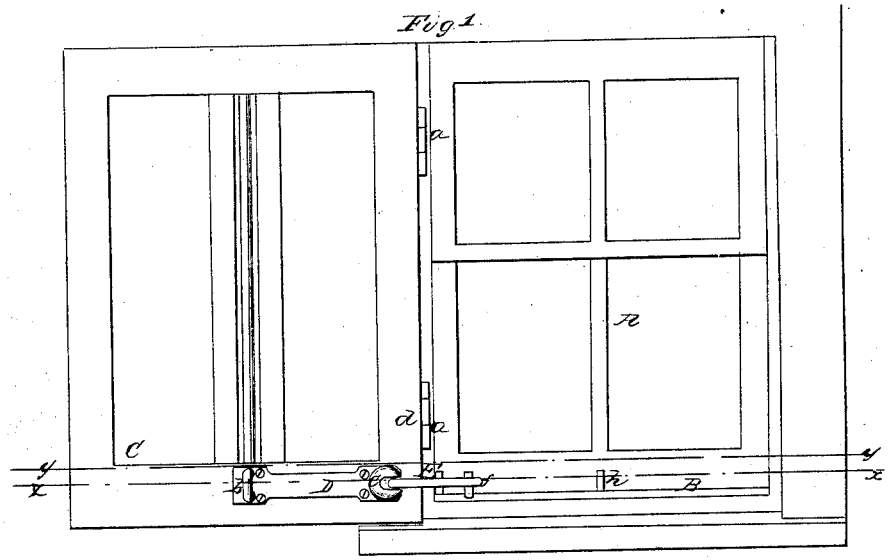
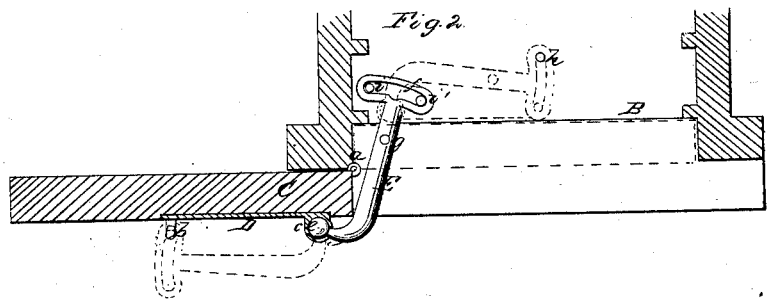
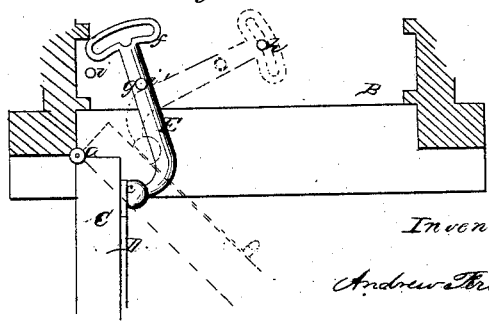
Witnesses
J. W. Combs
R. S. Spencer
Inventor
Andrew Ferber

UNITED STATES PATENT OFFICE.

ANDREW FERBER, OF ELIZABETH CITY, NEW JERSEY.

SHUTTER-FASTENER.

Specification of Letters Patent No. 26,979, dated January 31, 1860.

*To all whom it may concern:*

Be it known that I, ANDREW FERBER, of Elizabeth City, in the county of Union and State of New Jersey, have invented a new and Improved Fastening for Window-Shutters and Blinds; and I do hereby declare that the following is a full, clear, and exact description of the same, reference being had to the annexed drawings, making a part of this specification, in which—

Figure 1, is an outer face view of a window, having a shutter attached and secured in an open state by my invention. Fig. 2, a horizontal section of ditto, taken in the line $x$, $x$, Fig. 1. Fig. 3 a horizontal section of ditto taken in the line $y$, $y$, Fig. 1.

Similar letters of reference indicate corresponding parts in the several figures.

The object of this invention is to obtain, for window shutters and blinds, a fastening by which the shutters, by a very simple manipulation may be secured in an open and closed state, and also secured at any intermediate points between those positions, without depending upon any fixtures connected with the outer side of the building beyond the window sill, and thereby avoiding the necessity of extending the body and arm through the window, in order to adjust the fastening and shutter.

To enable those skilled in the art to fully understand and construct my invention, I will proceed to describe it.

A represents a window, B, the sill of the window casing, and C a shutter secured to the casing by hinges $a$, $a$, as usual. The above parts being of ordinary construction, do not require a minute description.

To the inner side of the shutter C, at is lower part, there is attached a metal plate D. This plate has a hook $b$, on it, near its outer end, and a socket $c$, at its inner end, said socket being at the lower part of the stile $d$, of the shutter which has the hinges $a$, attached to it. In this socket $c$ a ball $e$, is fitted snugly, but allowed to turn freely. This ball $e'$ is at the end of a rod E, which is curved at its junction with the ball as shown clearly in Figs. 2 and 3, the curved part being at right angles with the other part which is straight. The opposite end of the rod E, has a loop or eye $f$ formed on it. A hole $g$ is made in the rod E, the object of which will be presently seen.

The plate D, and rod E, are nearly of equal length, and by turning the rod E, so that its long straight part will be parallel or nearly so with plate D, the eye $f$, may be fitted on the hook $b$, as shown by the dotted lines in Fig. 2, and by closing the shutter C, and fitting the eye $f$ on a pin $h$, in the sill B, the shutter will be secured in a closed state as shown in red, Fig. 2. To secure the shutter in an open state, the rod E is turned back in a reverse position to that shown by the dotted lines in Fig. 2, and as shown in black in said figure, and the eye $f$ is fitted on two pins $i$, $i'$ in the sill B. In order to secure the shutter in a half open state, the rod E, is fitted on the pin $i'$, said pin passing through the hole $g$, of rod E, as shown in Fig. 3. To secure the shutter in a quarter open state, the eye $f$ of rod E is fitted on the pin $h$, as shown in red, Fig. 3. The shutter it will be seen may be secured at various points between an open and a closed state, by having pins driven in the sill B at different points.

This fastening will secure the shutter firmly in any of the positions named and as the rod E is very accessible it always being on the sill B, the shutter C, may be secured in an opened or closed state, or at any intermediate point, for which a sill pin is provided, with the greatest facility..

The device may be manufactured at a small cost, and very readily applied. It is as simple as possible and very durable, having no parts liable to become injured or deranged by use.

Having thus described my invention what I claim as new, and desire to secure by Letters Patent, is—

The plate D, attached to the shutter or blind C, provided with the hook $b$ and the socket $c$; the curved rod E, provided with the eye $f$ and the sphere or ball $e$, which is fitted in the socket $c$; and the pins in the sill B, the whole being arranged substantially as, and for the purpose set forth.

ANDREW FERBER.

Witnesses:
WM. H. ADAMS,
JABEZ B. COOLEY.